J. J. CAREY.
Corn-Planter Attachment.
No. 200,171. Patented Feb. 12, 1878.
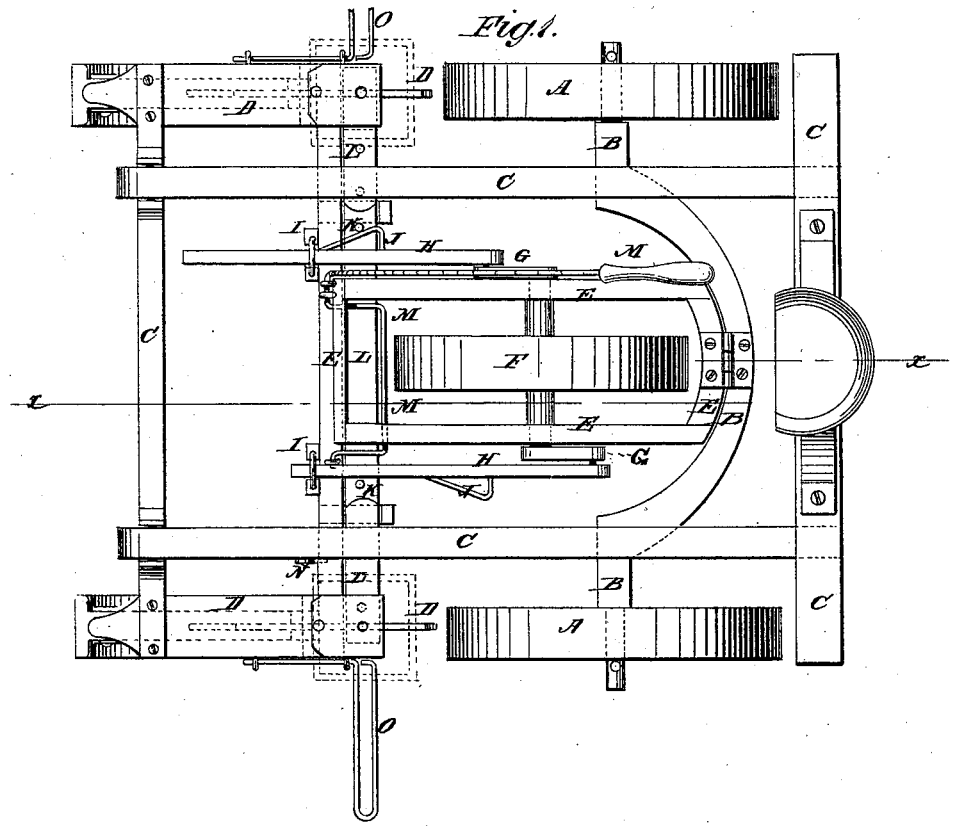
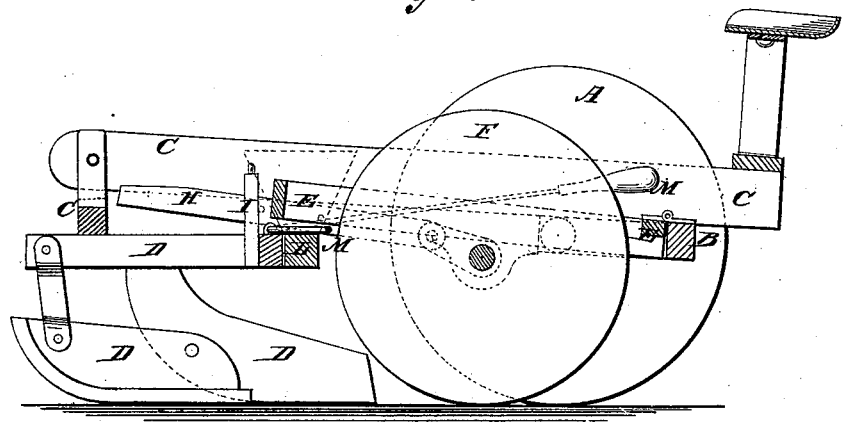
WITNESSES:
Francis McArdle.
C. Sedgwick
INVENTOR:
J. J. Carey
BY Munn & Co
ATTORNEYS.

UNITED STATES PATENT OFFICE.

JOHN J. CAREY, OF LA SALLE, ILLINOIS.

IMPROVEMENT IN CORN-PLANTER ATTACHMENTS.

Specification forming part of Letters Patent No. 200,171, dated February 12, 1878; application filed December 7, 1877.

*To all whom it may concern:*

Be it known that I, JOHN JOSEPH CAREY, of the city and county of La Salle, and State of Illinois, have invented a new and useful Improvements in Self-Dropping Attachment for Corn-Planters, of which the following is a specification:

Figure 1 is a top view of a corn-planter to which my improvement has been applied. Fig. 2 is a vertical longitudinal section of the same, taken through the line $x\ x$, Fig. 1.

Similar letters of reference indicate corresponding parts.

The object of this invention is to furnish an improved attachment for corn-planters which shall be so constructed as to be operated by the advance of the machine, which shall be simple in construction, convenient in use, not liable to get out of order, may be applied to any two-row planter, and will be accurate in operation, enabling the corn to be planted in exact check-row.

The invention consists in the construction and combination of parts, which will be hereinafter more fully described, and then pointed out in the claim.

A represents the wheels, which revolve upon the journals of the axle B. To the axle B is attached the frame C of the planter, to the forward part of which are attached the runners D, to open channels to receive the seed. The axle B is made with a rearward curve or bow, to the center of which is hinged a frame, E. To the side bars of the frame E is pivoted a third wheel, F, to the journals of which are attached, or upon them are formed cranks G, projecting in opposite directions.

To the cranks G are pivoted the rear ends of two bars, H, which rest upon the rear bar that connects the runners D, and work in slotted guides I attached to said bar. To the outer sides of the bars H are attached inclines J, which, as the said bars H move forward, alternately strike the pins or blocks K attached to the dropping-slide L, and move it alternately in opposite directions, so that the seed will be dropped twice at each revolution of the third wheel F.

M is a lever, the forward part of which is bent into crank form, and is pivoted to the rear connecting-bar of the runners D, so as to rest beneath the forward end of the hinged frame E. By this construction, by operating the lever M the forward end of the frame E will be raised, raising the third wheel F from the ground, so that the machine may be turned around and drawn from place to place without operating the seed-dropping device.

To the side bar of the frame C is pivoted a hook, N, to be hooked into the rear connecting-bar of the runners D, to support the said runners D away from the ground when passing from place to place.

To the sides of the runner-frame are hinged slotted guides O, to serve as guides to a marking-lever, to mark the line of the first row, to serve as a guide to the driver in starting in at the side of the field, so that the planting may be done in accurate check-row.

When the machine has been turned at the side of the field and the slotted guide O brought into line with the mark made in line with the first row, the driver raises the frame E and third wheel F by the lever M, and turns the said third wheel F with his foot until one of the inclines J operates the dropping-slide L and drops the seed. The driver then lowers the wheel F to the ground and drives forward, and the machine will plant the hills exactly in line with the cross-rows previously planted.

Having thus described my invention, I claim as new and desire to secure by Letters Patent—

The combination of the rearwardly-curved axle B, the hinged frame E, the third wheel F, the cranks G, the bars H, the inclines J, the pins or blocks K, and the guides I with the wheels A, the frame C, and the dropping-slide L of a corn-planter, substantially as herein shown and described.

JOHN J. CAREY.

Witnesses:
JOHN MARTIN,
MICHAEL CUMMINS.